INVENTOR
WILLIAM A. COLBURN
BY McGrew & Edwards
ATTORNEYS

United States Patent Office 3,526,279
Patented Sept. 1, 1970

3,526,279
METHOD OF STORING TOXIC FLUIDS AND THE LIKE
William A. Colburn, Denver, Colo., assignor to Atomic Storage Corporation, Denver, Colo., a corporation of Colorado
Filed Dec. 8, 1966, Ser. No. 600,152
Int. Cl. B65g 5/00; E21b 47/10
U.S. Cl. 166—250           20 Claims

ABSTRACT OF THE DISCLOSURE

A method for permanently storing toxic fluid wastes in the earth comprises the utilizing of a geologic section having a plurality of relatively permeable zones separated by layers of low permeability and in which one of the zones intermediate two others is of lower datum pressure than the others, providing a well into the zone below the lower pressure zone and injecting thereinto the fluid to be stored.

---

This application is related to application Ser. No. 203,092, filed June 18, 1962 in the names of Gilman A. Hill and William A. Colburn and assigned to the same assignee as the present invention and which was issued on Dec. 20, 1966 as Pat. No. 3,292,693.

This invention relates to the storage of fluids and particularly to an improved method for effecting safe and permanent storage or disposal of large quantities of toxic waste products and the like.

As pointed out in the above identified application, one of the most pressing problems facing industry is the safe and inexpensive disposal of toxic waste products. The need for disposal of waste products of chemical processes and particularly of toxic waste products has given rise to serious problems because of the necessity of effecting the disposal without contaminating accessible areas of the land or the sea. These problems have become particularly acute in the disposal of waste products in the atomic industry. Many of the methods proposed have required excessive handling and are expensive, others require continuous monitoring, and still others require careful control of ambient conditions. One method, for example, has been the sealing of the waste products in containers which are then deposited in the ocean in areas of great depth. Such disposal of waste products is expensive and furthermore involves risk due to possible deterioration of the containers with time, and leakage due to imperfections in manufacture or to injury of the containers subsequent to their deposit on the ocean floor. Accordingly, it is an object of this invention to provide an improved and inexpensive method for effecting storage of great quantities of chemical waste products.

It is another object of this invention to provide an improved and safe method for effecting the disposal of toxic waste products and the like and which affords the storage of great quantities of such products while preventing their flow or leakage to areas of human habitation.

It is another object of this invention to provide an improved method for effecting the safe and permanent disposal of large quantities of toxic waste products such as those produced in the atomic industry.

Briefly, in carrying out the objects of this invention, a geologic formation is utilized wherein a relatively low datum pressure zone lies above higher-datum-pressure zones. A well is then selected which enters one of the zones below the low pressure zone or such a well is drilled. The waste fluid products to be stored are then injected into one of the zones below the low pressure zone through the well bore whereupon they are prevented from escaping to zones above the low-pressure formation because of the pressure differences prevailing, the low pressure zone acting as a shield or umbrella isolating the injection or storage zone.

The features of novelty which characterize this invention are pointed out with particularity in the claims annexed to and forming a part of this specification.

For a better understanding of the invention in its various aspects together with further objects and advantages thereof, reference may be had to the following description taken in connection with the accompanying drawings, in which.

During the course of the investigations undertaken in connection with the making of the present invention, it was observed that, in a geologic section comprising a plurality of aquifers or permeable zones separated by layers of shale, the datum pressures (i.e., pressures measured in each zone converted to a common datum elevation) varied widely. Furthermore, it was found that in certain aquifers the datum pressures were lower than the datum pressures in other aquifers both stratigraphically higher and stratigraphically lower in the sedimentary section. Further, it was observed that the pressures in one aquifer varied and that occasionally the water datum pressure in one portion of the aquifer would be found to be lower than the datum pressures in surrounding parts of the same aquifer. It was then established that these locations of low pressure provide isolation zones which will collect any toxic fluids, both gases and liquids, which previously have been injected into stratigraphically lower zones and which fluids might tend to migrate upward through cracks, fractures, and other imperfections in the intervening shales.

Figure 1:
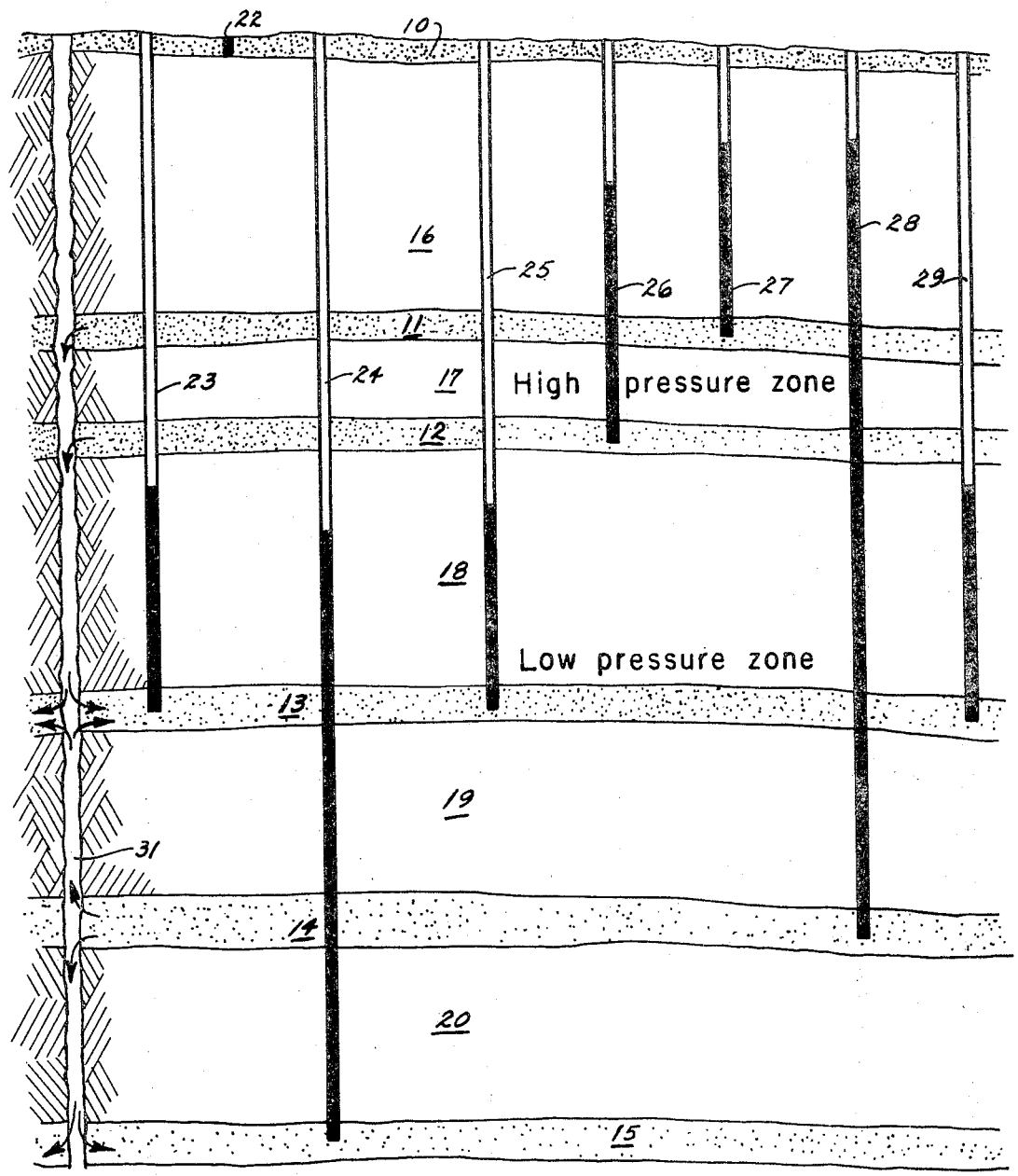
FIG. 1 is a diagrammatic view through a geologic section illustrating prevailing conditions suitable for the practice of the method of this invention.

By way of example, FIG. 1 illustrates a geologic section comprising permeable zones of aquifers 10, 11, 12, 13, 14, and 15 lying at successive depths in a formation comprising relatively impermeable layers or shales indicated at 16, 17, 18, 19, and 20. Wells have been indicated as drilled in the section, the first, indicated at 22, being a water well for producing water from the formation 10. The other wells are deep wells as indicated at 23, 24, 25, 26, 27, 28, and 29. The wells 23, 25, and 29 are all in communication with the same formation 13. The well 24 is extended to the formation 15, the wells 26 and 27 to formations 12 and 11, respectively, and the well 28 is in communication with the formation 14. The shaded portions of the wells indicate the datum pressures of the aquifers converted to the same datum elevation.

It will now be observed that the pressure of the well 24 is lower than any of the others and that the datum pressures of the wells 23, 25, and 29 are somewhat higher that that of the well 24 but are lower than any of the other pressures. Further, it will be observed that the datum pressure of the well 28 entering the aquifer 14 is higher than the pressures in the aquifers 13 and 15. Further, it will be observed that the pressures within the aquifer 13 as indicated by the shaded portions on the wells 23, 25, and 29 vary and that the pressure at the well 25 is lower than at either of the wells 23 and 29. It will be understood that the flow of water along any one of the aquifers is of the so-called Darcy type and is proportional to the difference in pressure and dependent upon the permeability of the aquifer. Flow between the permeable aquifers or zones may result from both Darcy type flow through fractures, fault zones, and other permeable channels, and from osmotic-like movement of water through the vary fine pore spaces of the geologic membrane-like shales which separate the permeable strata.

In order that conditions of the type indicated in FIG. 1 may exist over a long period of time, it is necessary that the water be moved by osmotic-like processes through the shales from the aquifers 13 and 15 to adjacent higher pressure aquifers such as 14 and 12. Because the permeable aquifer 14 is stratigraphically lower than aquifer 13, any Darcy type flow from the aquifer 14 through a fault such as indicated at 31 toward the potable water in aquifer 10 will be collected in aquifer 13 and prevented from reaching aquifer 10. Therefore, any toxic fluids which have been injected into aquifer 14 will be prevented from migrating to zones above aquifer 13 because of the low pressure in aquifer 13.

The fault 31 may be any form of permeable path, such as fractures, unplugged drill holes, wells with leaky cement seals around casing, etc., connecting the several aquifers. Water entering this fault from a higher pressure aquifer will flow toward the lower pressure aquifers such as 13 and 15 and in general this Darcy type flow of water through the geologic section is indicated by the solid arrows.

Various procedures have been suggested for disposing of toxic fluids underground and these methods have raised a primary concern that the fluids so deposited might migrate along natural or man-made leakage paths from the injection zone to another zone or area where the contamination would be harmful. The various leakage paths which may be met include those occurring as faults or fractures in addition to the man-made paths such as occur in faulty cement work, leaky casings, and inadequately plugged drill holes, by way of example. However, toxic fluids injected into aquifer 14 could not leak via any such leakage paths across aquifer 13 to any other aquifer above aquifer 13. Consequently, aquifer 14 would provides a safe toxic fluid storage zone. Furthermore, the injection of fluids in aquifer 14 will not materially raise the pressure in aquifer 13.

Figure 2:
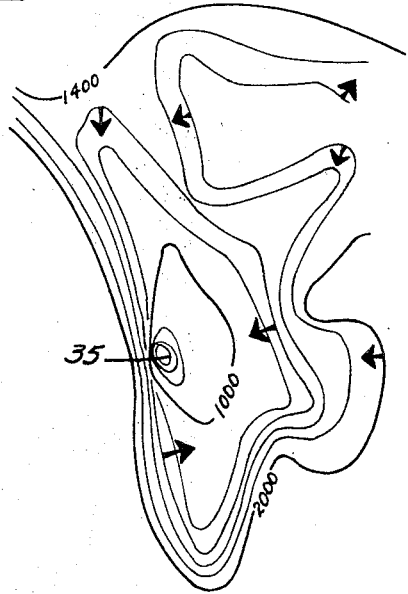
FIG. 2 is a potentiometric surface map of an aquifer suitable as the low datum pressure zone for the practice of this invention.

As an example of a particularly favorable storage site for toxic wastes and the like, there is shown in FIG. 2 a potentiometric surface map of an actual formation, the contour lines on the plot being indicated at intervals of 200 feet of potentiometric surface elevation. This plot might be considered generally by way of example as a map of the potentiometric surface elevations of a formation corresponding to that of the aquifer 13 in FIG. 1. The total area of the plot shown in FIG. 2 is of the general order of 150 by 200 miles. The pressure contours on this plot vary from the outer contour of 2000 feet of potentiometric surface elevation to an inner contour indicated at 35 which is the 400-foot contour. It will be observed that the potentiometric surface contours of the map decrease inwardly from the outer indicated 2000-foot contour to the inner 400-foot contour and that there is thus a wide area within which the formation fluid pressures vary in the manner generally indicated as that of the aquifer 13 in FIG. 1.

FIG. 2 clearly indicates the variations of datum pressures or potentiometric surface contours throughout a single permeable formation or aquifer and indicates a formation wherein the water flow is converging from all directions on the lowest pressure area. This inward flow of the Darcy law type is such that liquid which would escape from aquifer 14 and enter any part of the formation 13 within the convergent flow area will migrate toward the lowest pressure area 35 and could not escape; the aquifer 13 thus acts as a shield or umbrella. This fluid cannot escape by any natural processes without a change in the prevailing pressure conditions which are maintained by the geologic environment. The low pressures prevailing in the formation are maintained over long periods of geologic time by the continuous very low velocity osmotic transfer of water from the lower pressure zone to the high pressure zones through the ultrafine pore spaces which exist in the membrane-like shale separating the permeable aquifers.

Evidence secured in the field in addition to laboratory data and theoretical evaluation indicates that the osmotic membrane transfer of water can be caused by conditions such as (1) differences in electrical potential caused by variations in the degree of oxidation and reduction (redox potential) of the minerals, organic matter, and fluids in the rocks, (2) differences in temperature (thermal potential), and (3) differences in water salinity (chemical potential). The osmotic transfer of water through the shale pore spaces is completely harmless because (1) the extremely low velocities of movement of fluids in such fine pore spaces result in movement of only a few inches to a few feet in a thousand years, (2) toxic ions and many nonionized toxic products in the water are filtered out of solution by the membrane-like properties of shales, thereby preventing their movement through the shales, and (3) the very high cation exchange capacities of the clay mineral surfaces in the shale result in adsorbing a large portion of the toxic ions on the clay minerals, thereby fixing their location and preventing their further movement.

It will now be apparent that, if chemical wastes such as the toxic wastes from atomic operations are introduced through a well into a zone below a low pressure zone as illustrated, for example, by the zone about the well 25 in the formation 13 of FIG. 1, the wastes will flow into the formation and move outward away from well 28 for example at a rate determined by the fluid injection rate and injection pressure.

As pointed out above, the toxic wastes introduced into a formation such as 14 below a formation such as that shown at 13 in FIG. 2 cannot flow across aquifer 13. This will be more readily apparent from FIG. 3 which is a graph of a vertical section through the center of the portion 35 of the formation 13 of FIG. 2 and shows the other formations on either side thereof together with the datum pressures of the several aquifers, which portion 35 has a datum pressure equivalent to 455 feet of water above sea level as indicated by the liquid column 37. Above the aquifer 35 there are aquifers 38 and 39 having datum pressures of 4600 feet and 1750 feet, respectively. Below the aquifer 35 there are aquifers 40, 41, 42, and 43 which have datum pressures equivalent to water levels of 1470, 1770, 1860, and 1905 feet above sea level, respectively. It will thus be noted that the aquifer 35 has a datum pressure over 1000 feet of water head less than that of either adjacent aquifer.

Figure 3:
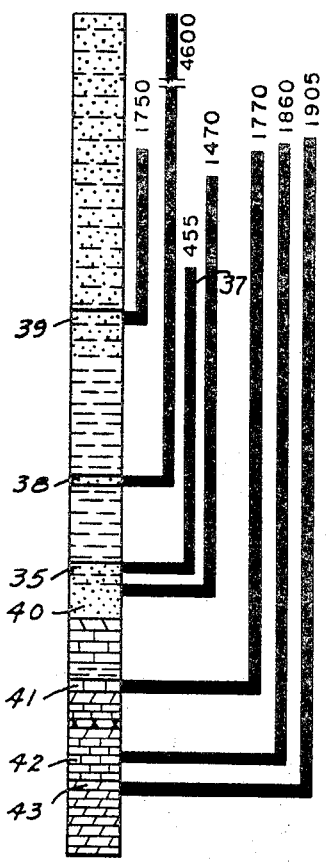
FIG. 3 is a graph indicating the pressure datum fluid heads or potentiometric surface elevations prevailing in a plurality of the permeable formations of a geologic section including the formation of FIG. 2.
Figure 4:
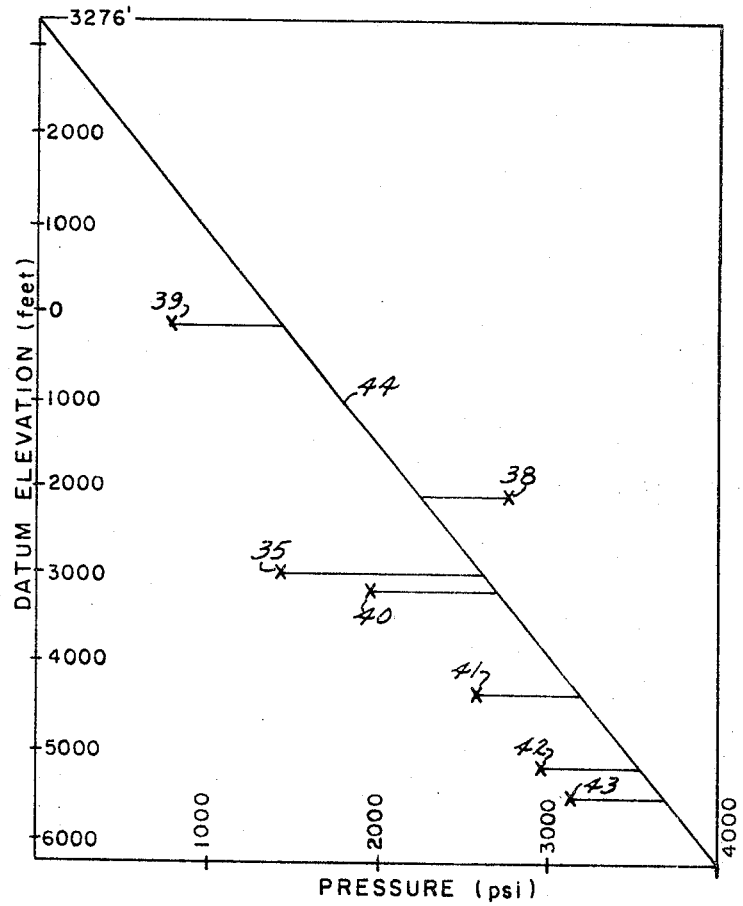
FIG. 4 is a pressure-depth graph indicating the variations in pressure prevailing between the formations of FIG. 3.

FIG. 4 is a datum elevation pressure curve to show the relationship of the pressures in the several aquifers indicated in FIG. 3. This graph, which indicates the variation in pressure between the many geologic formations, includes a sloping line 44 which indicates the pressures which would exist in the various formations if fresh hydrostatic conditions prevailed through the entire sedimentary section. It will be noted that the pressures in the formation as indicated by the points marked for each of the formations 35, 38, 39, 40, 41, 42, and 43 vary widely from the conventionally expected hydrostatic pressure head.

In FIG. 4 lines drawn parallel to the line 44 through the pressure points indicated will intersect zero elevation at the datum pressure for the point through which the line is drawn and will intersect the zero pressure axis at the elevation of the potentiometric surface of this point. Thus a line drawn through the point corresponding to the aquifer 35 and parallel to the line 44 will intersect the zero pressure or vertical axis at 455 feet of water above sea level, which is the potentiometric surface elevation indicated in FIG. 3.

It will thus be seen that the example of the formation 35 as indicated in FIGS. 2, 3, and 4 provides a region of convergent flow of water within the selected aquifer and further provides a formation in which no flow of the wastes which entered aquifer 13 from aquifer 14 can occur outwardly from the selected low-pressure aquifer. The selected aquifer is thus one which has both laterally and vertically convergent flow of substantial magnitude and such environment provides an assurance of safety because the toxic fluid injected in aquifer 14 cannot escape along any Darcy flow leakage path across aquifer 13. The only escape of fluid from aquifer 13 is by osmotic-type transfer of water through the ultrafine pore spaces of the shale membranes, and as pointed out above this escape path is completely harmless even over long periods of geologic time.

In addition to employing convergent flow aquifers, the method of this invention is practical under other flow conditions. For example, a low datum pressure aquifer such as 15 in FIG. 1 can provide assurance of safety for the injection of toxic waste in aquifers below aquifer 15 even though flow in 15 may be all in one direction and not converging. If the rate of flow of water in aquifer 15 is sufficiently low so that the time required for the toxic wastes to move to areas where the water is used for other purposes is very much longer than the dangerous life of the waste, then 15 would provide safety for a disposal zone below aquifer 15. For example, representative rates of flow in permeable geologic formations are from a few inches to a few tens of feet per year. Therefore, if the dangerous life of a particular waste is 200 years and the rate of flow is 2 feet per year, the waste would travel 400 feet during the dangerous life of the waste. Under such flow conditions it would be safe to store wastes of 1000-year-danger life in an aquifer below aquifer 15 if the reservoir water from 15 were not used for other purposes at locations closer than a few miles from the injection site.

The capacity of even a relatively small permeable lens for storing waste material is large. For example, a 3-mile by ½-mile wide 30-foot sand lens with 15 percent porosity would contain approximately 1,500,000,000 gallons or approximately 33,000,000 barrels of formation water. If the waste material is injected in one or more wells and a comparable amount of formation water is withdrawn from other wells in a manner to control properly the fluid flow pattern, approximately one-half of the formation, that is, 16,000,000 barrels, may be replaced before any injection water is produced in the withdrawal wells. If the toxic waste material exists as a dissociated cation, then, due to cationic exchange of the mineral surfaces, from 3 to 10 times this volume of water, that is, from 50,000,000 to 150,000,000 barrels, may be injected before any toxic cations are produced at the withdrawal wells.

The electrochemical membrane flow, that is, osmotic flow, is the important factor in creating the desired low datum pressure environment which safely traps any injected toxic fluid. Although numerous faults, fractures, leaky casings, poor cement jobs, or other leakage paths exist between the zones which must be protected from contamination and the permeable lens selected for waste disposal, no toxic fluid can escape to non-contaminated zones because all fluid flow along these leakage paths will be toward the low-pressure lens. The only flow out of this lens will be by the very slow osmotic membrane movement of water through the shale pore spaces where any toxic cations will be substantially excluded by membrane filtration or absorbed by ion exchange processes. Consequently, an aquifer located below this low datum pressure environment is a safe place to dispose of toxic fluids.

When a formation has been selected for the disposal of chemical wastes or other toxic fluids, a plurality of injection wells may be drilled in a row, the spacing being in the order of 40 acres, and a second row of withdrawal wells may be drilled along a line approximately offsetting the injection wells by 40-acre spacing. When atomic waste is injected in the first row of wells, reservoir water is withdrawn from the withdrawal well to obviate the need for high injection pressures and to control the movement of waste into the reesrvoir. The fluids from each withdrawal well will be monitored to detect the presence of the waste, for example by the introduction of a Geiger counter in the monitoring well, and as soon as the waste appears at that well, injection at the first well is stopped and a third well drilled beyond the withdrawal well is then employed as a withdrawal well and injection is begun through the first withdrawal well. By this procedure a great area may be covered at a rate dependent upon the actual distribution of the waste materials in the formation.

The method of this invention provides for the storage of vast quantities of chemical wastes and particularly of toxic wastes without the danger of contamination of other zones throughout indefinite periods in a manner that the storage is effectively permanent, safe, and inexpensive. Toxic atomic wastes can be stored in this manner indefinitely without danger of leakage through any fracture or other damage to the reservoir formation. By employing storage zones below the low pressure shield zone, greater quantities of fluid may be stored than would be stored if the injection of the fluids was solely into the low pressure zone.

While the invention has been described in connection with particular environments and specific formations, various other applications and different formation conditions may be employed. Therefore it is not desired that the invention be limited to the specific details illustrated and described and it is intended by the appended claims to cover all modifications which fall within the spirit and scope of the invention.

I claim:

1. The method for storing fluids which comprises utilizing a geologic section having first and second and third relatively permeable zones spaced from one another and separated by layers of low permeability, the second zone being located intermediate the first and third zones and having a datum pressure lower than those of the first and third zones and said third zone being located below said second zone, providing, a well bore extending into said third zone, and injecting fluid to be stored through said bore into said third zone.

2. The method of storing fluids as set forth in claim 1 including the steps of drilling into said third zone a second bore spaced from said first bore, withdrawing reservoir fluid from the second bore and monitoring the fluid withdrawn from the second bore to determine when fluid injected through said first bore reaches said second bore, and thereupon stopping injection into said first bore and thereafter injecting fluid into said second bore.

3. The method of storing fluids as set forth in claim 2, including the steps of drilling a third bore into said third zone and withdrawing reservoir fluid from the third bore.

4. The method of storing fluids as set forth in claim 1 including drilling into said third zone a second bore spaced from said first bore, withdrawing reservoir fluid from the second bore and monitoring the fluid withdrawn from the second bore to determine when fluid injected through said first bore reaches said second bore, and thereupon stopping withdrawal from said second bore.

5. The method for effecting permanent storage of fluids for toxic-waste-product disposal and the like which comprises utilizing a geologic section having first and second and third relatively permeable zones spaced from one another and separated by layers of low permeability, the second zone being located intermediate the first and third zones and having a datum pressure lower than those of the first and third zones and said third zone being located below said second zone, providing a well bore extending into said third zone, and injecting fluid to be stored through said bore into said third zone.

6. The method for storing fluids and for preventing leakage of the stored fluids which comprises utilizing a geologic section having a first zone in which all natural pressure induced fluid flow is converging by means of only the naturally existing fluid flow characteristics of the geologic section toward one part of the geologic section, said section including a second and higher datum pressure zone located below said first zone, said section having a third zone located above said first zone and having a higher datum pressure than that of said first zone, providing a well bore extending into said second zone, and injecting fluid to be stored through said bore into said second zone.

7. The method of storing fluids as set forth in claim 6 including the steps of drilling into said second zone a second bore spaced from said first bore, withdrawing reservoir fluid from the second bore and monitoring the fluid withdrawn from the second bore to determine when fluid injected through said first bore reaches said second bore, and thereupon stopping withdrawal from said second bore.

8. The method of storing fluids as set forth in claim 7 including the steps of drilling a third bore into said second zone and withdrawing reservoir fluid from the third bore.

9. The method for effecting permanent storage of fluids for toxic waste disposal and the like and for preventing leakage of the stored fluids which comprises utilizing a geologic section having a first zone in which all natural pressure induced fluid flow is converging by means of only the natural existing fluid flow characteristics of the geologic section toward one part of the geologic section, said section having a second and higher datum pressure zone located below said first zone, said section having a third zone located above said first zone and having a higher datum pressure than that of said first zone, providing a well bore extending into said second zone, and injecting fluid to be stored through said bore into said second zone.

10. The method of storing fluids as set forth in claim 9 including the steps of drilling into said second zone a second bore spaced from said first bore, withdrawing reservoir fluid from the second bore and monitoring the fluid withdrawn from the second bore to determine when fluid injected through said first bore reaches said second bore, and thereupon stopping withdrawal from said second bore.

11. The method of storing fluids as set forth in claim 10 including the steps of drilling a third bore into said second zone and withdrawing reservoir fluid from the third bore.

12. The method of storing fluids which comprises utilizing a geologic section having a first zone in which fluid is converging toward one part of the geologic section and a second zone below said first zone and having a datum pressure higher than that of said first zone, said section having a third zone located above said first zone and having a higher datum pressure than that of said first zone, providing a well bore extending into said second zone, injecting fluid to be stored through said bore into said second zone, drilling into said second zone a second bore spaced from said first bore, withdrawing reservoir fluid from the second bore and monitoring the fluid withdrawn from the second bore to determine when fluid injected through said first bore reaches said second bore, and thereupon stopping withdrawal from said second bore.

13. The method of storing fluids as set forth in claim 12 including the steps of drilling a third bore into said second zone and withdrawing reservoir fluid from the third bore.

14. The method for effecting permanent storage of fluids for toxic waste disposal and the like which comprises utilizing a geologic section having a first zone in which fluid flow is converging toward one part of the geologic section and a second zone below said first zone and having a datum pressure higher than that of said first zone, said section having a third zone located above said first zone and having a higher datum pressure than that of said first zone, providing a well bore extending into said second zone, injecting fluid to be stored through said bore into said second zone, drilling into said second zone a second bore spaced from said first bore, withdrawing reservoir fluid from the second bore and monitoring the fluid withdrawn from the second bore to determine when fluid injected through said first bore reaches said second bore, and thereupon stopping withdrawal from said second bore.

15. The method of storing fluids as set forth in claim 14 including the steps of drilling a third bore into said second zone and withdrawing reservoir fluid from the third bore.

16. The method for storing fluids and for preventing leakage of the stored fluids which comprises utilizing a geologic section having a plurality of geologic layers and including a zone in which all natural pressure induced fluid flow produced only by the naturally existing fluid flow characteristics of the geologic section is toward one geologic layer which is at a lower relative natural pressure than the other layers of said zone, said section having one of said layers above said zone and at a higher relative natural pressure than that of said zone, providing a well bore into a lower layer situated below said lower pressure layer of said zone, and injecting fluid to be stored through said well bore into said lower layer of said zone.

17. The method of storing fluids as set forth in claim 16 including the steps of drilling into said lower layer of said zone a second bore spaced from said first bore, withdrawing reservoir fluid from the second bore and monitoring the fluid withdrawn from the second bore to determine when fluid injected through said first bore reaches said second bore, and thereupon stopping withdrawal from said second bore.

18. The method of storing fluids as set forth in claim 17 including the steps of drilling a third bore into said lower layer of said zone and withdrawing reservoir fluid from the third bore.

19. The method for storing fluids which comprises utilizing a geologic section having a plurality of geologic layers and including a zone in which fluid flow is toward one geologic layer which is at a lower relative pressure than the other layers of said zone, said one layer being located between two of said other layers one above and one below said zone, providing a well bore into a lower layer situated below the lower pressure layer of said zone, injecting fluid to be stored through said well bore into said lower layer, drilling into said lower layer a second bore spaced from said first bore, withdrawing reservoir fluid from the second bore and monitoring the fluid withdrawn from the second bore to determine when fluid injected through said first bore reaches said second bore, and thereupon stopping withdrawal from said second bore.

20. The method of storing fluids as set forth in claim 19 including the steps of drilling a third bore into said lower layer and withdrawing reservoir fluid from the third bore.

References Cited

UNITED STATES PATENTS

| | | | |
|---|---|---|---|
| 1,921,358 | 8/1933 | Hill et al. | 61—.5 X |
| 2,357,703 | 9/1944 | Teichmann | 166—10 X |
| 2,548,059 | 4/1951 | Ramsey | 166—9 |
| 2,707,171 | 4/1955 | Miller | 166—42 X |
| 2,928,247 | 3/1960 | Hubbell | 61—.5 |
| 3,152,640 | 10/1964 | Marx | 61—.5 X |
| 3,175,614 | 3/1965 | Wyllie | 166—42 |
| 3,283,813 | 11/1966 | Brownscombe et al. | 166—9 |
| 3,292,693 | 12/1966 | Hill et al. | 166—2 |

OTHER REFERENCES

Burlingame, M. V.: Aquifer Storage Ideal for Natural Gas, in Pipeline Industry, February 1965, pp. 32–36.

Henkel, H. O.: Deep-Well Disposable of Chemical Wastes, in Chem. Eng. Progress, 51(12), December 1955, pp. 551–554.

CHARLES E. O'CONNELL, Primary Examiner

I. A. CALVERT, Assistant Examiner

U.S. Cl. X.R.

166—268, 305